US010348799B2

(12) United States Patent
Nair

(10) Patent No.: US 10,348,799 B2
(45) Date of Patent: Jul. 9, 2019

(54) UNIQUE DEVICE AUTHENTICATION VIA A BROWSER

(71) Applicant: CA, Inc., New York, NY (US)

(72) Inventor: Ajit Nair, Hyderabad (IN)

(73) Assignee: CA, Inc., New York, NY (US)

( * ) Notice: Subject to any disclaimer, the term of this patent is extended or adjusted under 35 U.S.C. 154(b) by 253 days.

(21) Appl. No.: 15/228,440

(22) Filed: Aug. 4, 2016

(65) Prior Publication Data

US 2018/0041509 A1 Feb. 8, 2018

(51) Int. Cl.
*H04L 29/06* (2006.01)
*H04L 29/08* (2006.01)
*H04L 12/46* (2006.01)

(52) U.S. Cl.
CPC ............ *H04L 67/02* (2013.01); *H04L 63/029* (2013.01); *H04L 63/08* (2013.01); *H04L 63/166* (2013.01); *H04L 12/4641* (2013.01)

(58) Field of Classification Search
CPC ....... H04L 63/02; H04L 63/029; H04L 63/08; H04L 63/0876; H04L 63/0884; H04L 63/10; H04L 63/166; H04L 67/02; H04L 12/4641
See application file for complete search history.

(56) References Cited

U.S. PATENT DOCUMENTS

| 6,023,764 | A  | * | 2/2000  | Curtis   | G06F 21/606 |
|           |    |   |         |          | 726/5       |
| 9,055,061 | B2 | * | 6/2015  | Israel   | G06F 21/31  |
| 9,225,690 | B1 | * | 12/2015 | Fitch    | H04L 63/0428|
| 2006/0212934 | A1 | * | 9/2006 | Cameron | H04L 63/0272|
|           |    |   |         |          | 726/12      |
| 2006/0272011 | A1 | * | 11/2006 | Ide    | G06F 21/31  |
|           |    |   |         |          | 726/5       |
| 2012/0079069 | A1 | * | 3/2012 | Tian    | H04L 51/22  |
|           |    |   |         |          | 709/217     |

OTHER PUBLICATIONS

Entrust TruePass™ Product Portfolio, Strong Authentication, Digital Signatures and end-to-end encryption for the Web Portal, Technical Overview, Jul. 2003, 28 pages.

* cited by examiner

*Primary Examiner* — Minh Dinh
(74) *Attorney, Agent, or Firm* — Meyertons, Hood, Kivlin, Kowert & Goetzel, P.C.

(57) ABSTRACT

Techniques are disclosed relating to unique device authentication via browser. In one embodiment, a server computer system receives, from a browser program executing on a client computer system, a request to authenticate to a private network. The server computer system causes a script to be downloaded to the client computer system, the script being executable by the browser program to establish a connection with a local host program executing on the client computer system. The server computer system receives, from the browser program, authentication information that is based on communication between the browser program and the local host program over the connection. The server computer system may then perform a process responsive to the request to authenticate the client computer system to the private network using the received authentication information. In some embodiments, the authentication information includes an identifier that uniquely identifies the client computer system within the private network.

14 Claims, 9 Drawing Sheets

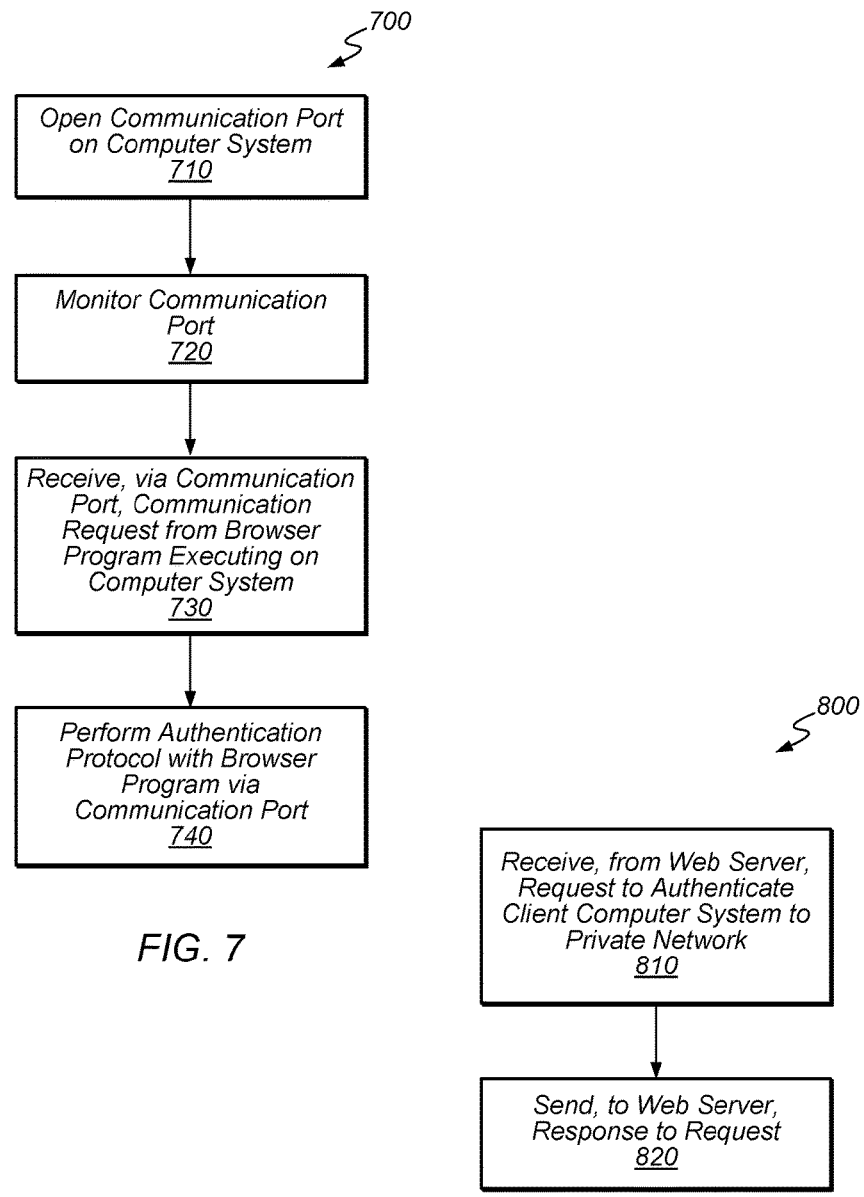

UNIQUE DEVICE AUTHENTICATION VIA A BROWSER

BACKGROUND

Technical Field

This disclosure relates generally to computer networks, and, more specifically, to authenticating a device over a network connection.

Description of the Related Art

A modern computer network may use a firewall appliance to isolate an internal local area network (LAN) from being accessible by an external source in order to protect sensitive internal resources accessible via the LAN. In many instances, however, an authorized person may need to gain access to a private LAN when located externally to the LAN. As such, a network appliance (e.g., a virtual private network (VPN) appliance) may verify an identity of a person to ensure that the person is authorized to access a private network before granting such access.

In some instances, a company may want to verify not only a person's identity, but also verify information about the device being used by the person. For example, a company might have a policy restricting which devices may be used to connect to its internal network such as only company-supplied devices (as opposed to personal devices owned by employees). As such, the company may want to ensure that an authorized person is using an authorized device before granting access to an internal network.

SUMMARY

The present disclosure describes embodiments in which a computer system performs an authentication process in order to access a private network. In some embodiments, a client computer system executing a browser program sends, to a server computer system, a request to authenticate to a private network. The server computer system causes a script to be downloaded to the client computer system that is executable by the browser program to establish a connection with another program, which may be executing on the client computer system. The server computer system receives, from the browser program, authentication information that is based on communication between the browser program and the other program over the connection. In some embodiments, the authentication information includes an identifier that identifies the client computer system within the private network and/or a connection state value for the connection. The server computer system may then perform a process responsive to the request to authenticate the client computer system to the private network using the received authentication information.

BRIEF DESCRIPTION OF THE DRAWINGS

FIG. 7 is a flow diagram illustrating an embodiment of a method performed by the client computer system.

FIG. 8 is a flow diagram illustrating an embodiment of a method performed by the risk assessment server.

Figure 1:
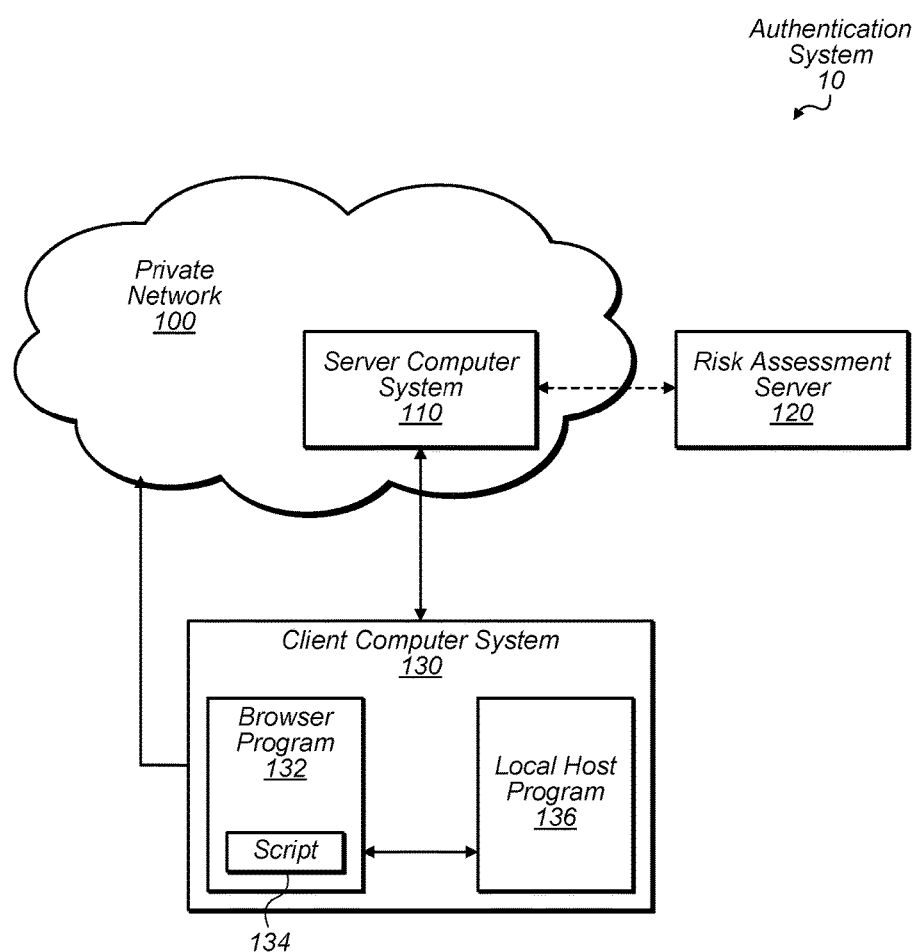
FIG. 1 is a block diagram illustrating an embodiment of an authentication system.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "risk assessment server that is configured to determine whether to authenticate the client computer system" is intended to cover, for example, a computer system that has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, a web browser plug-in may be used as one option for authenticating an external device attempting to access an internal network. (As used herein, the term "plug-in" is to be interpreted according to its understood meaning in the art, and includes a software component that adds specific functionality to an existing application, such as a web browser.) A problem, however, is that many web browsers are discontinuing support for some browser plug-ins for security reasons—one of the more notable examples being plug-ins that use the Netscape Plugin API (NPAPI) such as Flash™ or Java™ web applets. This legacy API is known to have multiple security holes and may allow for unsigned plug-ins from a malicious entity to be executed on a client device. A consequence of plug-in support being discontinued, however, is that browser plug-ins may no longer be used for authentication going forward.

The present disclosure describes embodiments in which a client device may authenticate without the use of a browser plug-in. As will be described below, in various embodiments, a client device requesting access to a private network executes a browser program that downloads a script from a web server. In some embodiments, the script causes the browser program to establish a connection with a local host program running on the client device. (As used herein, the term "local host" refers to a program executable to receive network traffic from another program executing on the same computer system, and may be accessible via the domain name "localhost.") Based on information communicated over this established connection, the browser program sends authentication information to a server computer system that controls access to the private network. In some embodiments, this authentication information may include device-specific information collected by the local host program about the computing device. In such an embodiment, the script may not be able to collect this information directly due to limitations imposed by the browser program. In other embodiments, this authentication information may merely indicate a status of the connection between the browser program and the local host program. That is, in establishing the connection, the browser program and the local host program may perform a mutual authentication that includes verifying certificates held by the programs. These certificates may be previously stored in the client computing device—e.g., by a network administrator during provisioning of the device. If the connection cannot be established (e.g., because the certificates were never installed in the device or are invalid), the authentication information may identify the connection state as a failure. Based on the authentication information from the browser program, the server computer system may grant or deny the client computer system's request to access the private network.

Turning now to FIG. 1, a block diagram of an authentication system 10 is depicted. In the illustrated embodiment, authentication system 10 includes a private network 100, server computer system 110, risk assessment server 120, and client computer system 130. In some embodiments, server computer system 110 and the Risk Assessment Server 120 are considered a part of private network 100 as shown in FIG. 1; in other embodiments, system 110 and the Risk Assessment Server 120 are external to network 100. As shown, client computer system 130, in turn, includes a browser program 132, which includes a script 134, and a local host program 136. In some embodiments, system 10 may be implemented differently than shown. For example, in some embodiments, functionality described with respect to server computer system 110 and risk assessment server 120 may be performed by the same computer system. In some embodiments, local host program 136 may be located externally to client computer system 130.

Private network 100 is a computer network having restricted access for external devices. For example, in some embodiments, network 100 is a LAN having a gateway coupling the LAN to the Internet. The gateway may implement firewall that restricts which incoming traffic is permitted to enter network 100 as well as restrict the destinations in network 100 that are permitted to receive the traffic. Private network 100 may include a single or multiple devices, which may store confidential data and/or provide services for which restricted access is desired.

Server computer system 110, in one embodiment, is a computer system that controls access to private network 100 by external devices such as client computer system 130. In some embodiments, client computer system 130 may access private network 100 directly through server computer system 110—e.g., system 110 may function as a gateway. In other embodiments, private network 100 may be accessed independently of system 110. For example, system 110 may provide a token (e.g., a browser cookie, Kerberos ticket, etc.) to client computer system 130 to indicate that the device is authorized to access private network 100. Client computer system 130 may then present this token upon attempting to access network 100. In the illustrated embodiment, server computer system 110 is configured to interface with risk assessment server 120 in order to authenticate client computer system 130. (In other embodiments, system 110 may implement functionality of server 120.) In such an embodiment, server computer system 110 may send at least a portion of the authentication information received from client computer system 130 and rely on server 120 to verify this information. Accordingly, server computer system 110 may receive an indication from server 120 identifying whether the verification is successful, and system 110 may perform one of various processes depending on the outcome of the verification. For example, in some embodiments, system 110 may merely grant or deny client computer system 130's request to access private network 100. In another embodiment, system 110 may solicit additional information from client computer system 130 such as a user's name and password before authorizing access to network 100. In some embodiments, system 110 may cache an indication that client computer system 130 has been authenticated for future accesses of private network 100. Server computer system 110 is described in greater detail below with respect to FIG. 2.

Risk assessment server 120, in one embodiment, is a computer system configured to verify authentication information (or said more generally, is configured to assess whether an entity, such as client computer system 130, poses a threat to network 100). Accordingly, server 120 may store authentication information associated with authorized entities and compare this information against authentication information received from system 110. This stored authentication information may include information about an authorized device (such as a device identifier as discussed below with FIG. 3) and/or information about an authorized user (such as a username and password). In some embodiments, server 120 implements a standard protocol for communicating with server computer system 110 such as the TCP or SSL protocol. Risk assessment server 120 is described in greater detail below with respect to FIG. 4.

Client computer system 130, in one embodiment, is a computer system attempting to access private network 100 from a location external to network 100. In various embodiments, client computer system 130 interacts with server computer system 110 via browser program 132. Accordingly, when a user wants to access private network 100, the user may direct the browser program 132 to a website hosted by server computer system 110 in order to submit a request to access network 100. In response to this request, system 110 may serve webpage content including script 134 to browser program 132. As will be described below, in various embodiments, script 134 is executable by browser program 132 to obtain authentication information usable by server computer system 110 to authenticate client computer system 130 to private network 100.

Browser program 132 may be any suitable web browser such as Firefox™ Chrome™, Edge™, Safari™, etc. In various embodiments, program 132 does not support the use of plug-ins—or, at least, restricts use of particular types of plug-ins such as those using the Netscape Plugin API (NPAPI). Accordingly, in such an embodiment, program 132 may not be able to use a plug-in to authenticate with server computer system 110. In various embodiments, program 132 does, however, support execution of scripts written in various languages such as JavaScript™, VBScript, etc. That being said, program 132 may offer limited functionality to an executing script (e.g., program 132 may execute script in a sandboxed environment).

Script 134, in one embodiment, is executable to obtain authentication information by causing a browser program 132 to establish a connection with local host program 136. In some embodiments, in response to establishing this connection, local host program 136 may provide the authentication information used by system 110 over the connection. That is, as will be described in greater detail below with respect to FIG. 3, local host program 136 may collect various information from client computer system 130 that uniquely identifies system 130. This collected information may then be provided to browser program 132, which communicates the information to system 110 for authentication. In such an embodiment, script 134 may not be able to access this information directly due to limited functionality offered by browser program 132, and thus relies on program 136 to collect this information.

In some embodiments, script 134 is executable to cause browser program 132 to establish a secure connection with local host program 136. In some embodiments, this connection is established using a standard protocol such as Secure Socket Layer (SSL), Transport Layer Security (TLS), etc. As part of establishing this connection, browser program 132 and local host program 136 may perform a handshake that includes the exchange and verification of public-key certificates. If the verification of these certificates fails causing the secure connection to not be established, browser program 132 may indicate this failed connection state in the authentication information provided to server computer system 110, which may deny system 130's request to access network 100. Notably, in doing so, server computer system 110 is using the status of the connection to authenticate client computer system 130 (rather than any information collected by local host program 136). Accordingly, although the secure connection may be used by local host program 136, in some embodiments, to convey collected information about system 130, the mere establishment of the secure connection, in other embodiments, may be used to authenticate client computer system 130. That is, in such an embodiment, local host program 136 may not collect any information from system 130; rather, the authentication may rely merely on the successful verification of certificates exchanged during the handshake between browser program 132 and local host program 136. For example, a network administrator may provision all authorized devices with a valid certificate for the browser program 132 and a valid certificate for the local host program 136. Assuming client computer system 130 is an authorized device, the verification of these certificates should complete successfully allowing the connection to be established. In such an embodiment, browser program 132 may merely indicate the success of this connection establishment in the authentication information provide to server computer system 110, which, in turn, may grant access to network 100 based on this successful connection state.

Local host program 136, in one embodiment, is an application that monitors for network traffic from browser program 132. Accordingly, program 136 may be executable to open a network port (e.g., a Transport Control Protocol (TCP) port or User Datagram Protocol (UDP) port) at system 130 over which to receive traffic. In some embodiments, this port is not exposed externally to system 130—e.g., the port is accessible only via the loopback Internet Protocol (IP) address 127.0.0.1 associated with the localhost domain name (as opposed to an externally exposed IP address assigned to client computer system 130). In various embodiments, local host program 136 monitors for a particular type of network work traffic. For example, in some embodiments, program 136 implements a WebSocket server. In such example, script 134 may accordingly redirect browser program 132 to the address wss://127.0.0.1:443. In some embodiments, local host program 136 may be installed by an installer program during provisioning of client computer system 130 as discussed below with respect to FIG. 9.

Although program 136 is depicted in FIG. 1 as being a "local host" program within system 130, program 136, in other embodiments, may not be a local host program—i.e., program 136 may be located externally system 130. In such an embodiment, script 134 may be executable to cause browser program 132 to establish a connection with the program 136 executing on the external computing device. As discussed above, browser program 132 may obtain authentication information based on the establishment of this connection and convey that information to server computer system 110. In some embodiments, this information may include a value indicating the state of the connection and/or additional information provided by program 136.

Figure 2:
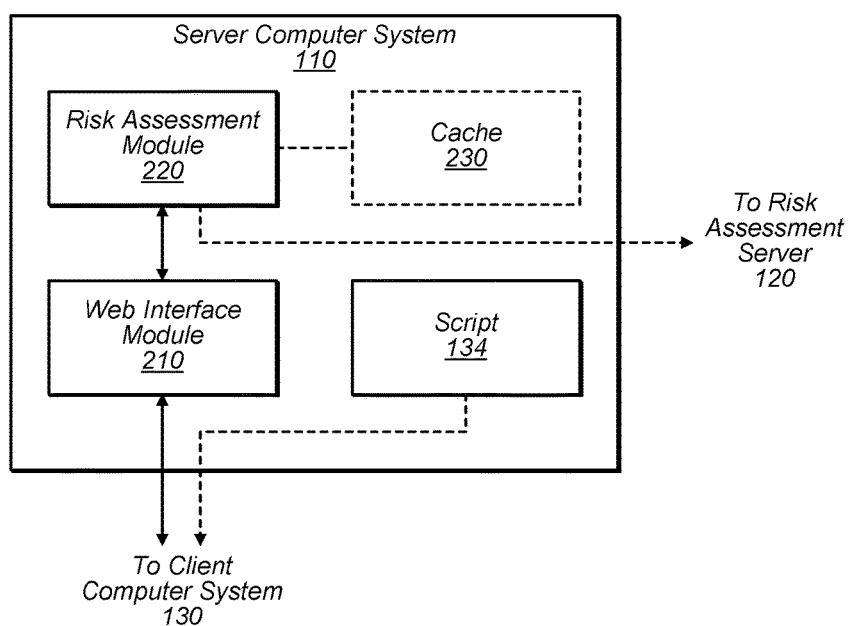
FIG. 2 is a block diagram illustrating an embodiment of a server computer system included in the authentication system.

Turning now to FIG. 2, a block diagram of a server computer system 110 is depicted. In the illustrated embodiment, server computer system 110 includes a web interface module 210, a risk assessment module 220, cache 230, and script 134. In some embodiments, system 110 may be implemented differently than shown. For example, in some embodiments, system 110 may not include cache 230 and/or communicate with server 120.

Web interface module 210, in one embodiment, is a module executable to interface with client computer system. In some embodiments, module 210 implements a web server (such as an Apache™ HTTP server) that provides a website allowing browser program 132 to request access to private network 100 and submit authentication information. As part of servicing requests to network 100, module 210 may serve webpage content including script 134. Module 210 may also present a login page allowing a user to enter login information such as a user name and password.

Risk assessment module 220, in one embodiment, is a module executable to handle interfacing with risk assessment server 120. Accordingly, module 220 may receive submitted authentication from module 210 and deliver this information to server 120 for verification. Module 220 may also receive a response from server 120 and instruct module 210 to indicate whether system 130's request to access network 100 has been granted or denied. In various embodiments, module 220 may maintain a cache 230 for previously authenticated client computer systems 130 in order to expedite the authentication process. In such an embodiment, cache 230 may include previously submitted authentication information of authorized devices (e.g., a device identifier as discussed with FIG. 3) and/or authentication information of authorized users (e.g., a user name and password). If a previously authorized client computer system 130 requests access to network 100, module 220 may determine, from cache 230, that the system 130 has been previously authorized and may grant an access request without conferring with risk assessment server 120.

Figure 3:
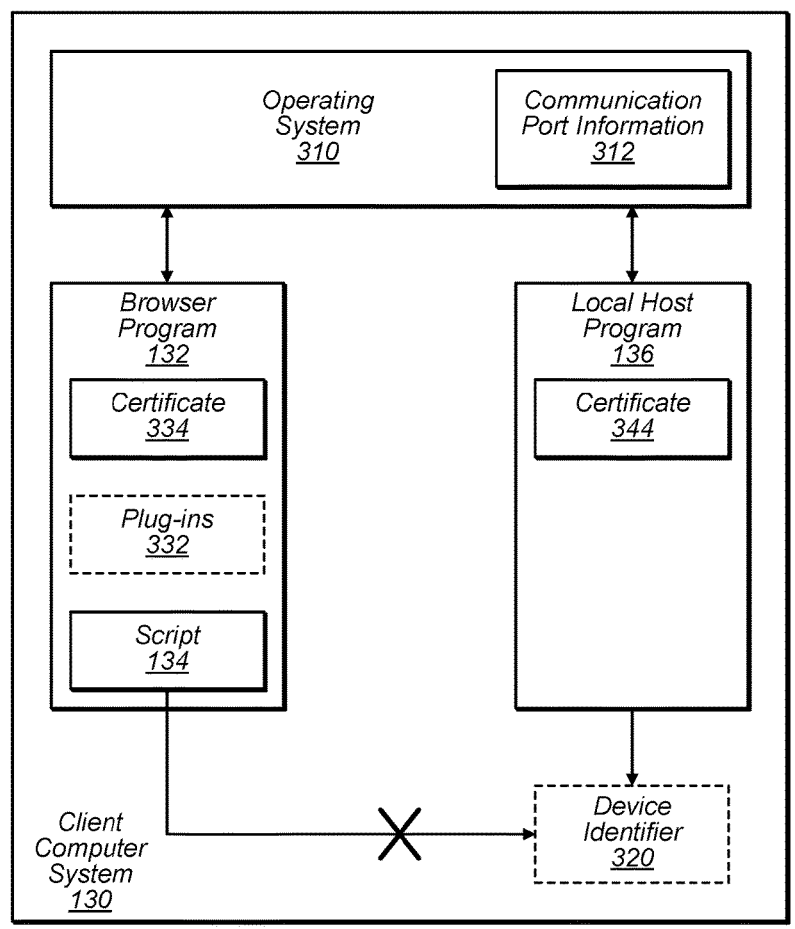
FIG. 3 is a block diagram illustrating an embodiment of a client computer system included in the authentication system.

Turning now to FIG. 3, a block diagram of client computer system 130 is depicted. In the illustrated embodiment, client computer system 130 includes operating system 310, browser program 132, and local host program 136. In some embodiments, system 130 may (or may not) include a device identifier 320. As shown, browser program 132 includes a script 134 and a certificate 334. In some embodiments, program 132 may also (or may not) include plug-ins 332. In the illustrated embodiment, local host program 136 includes certificate 344.

Operating system 310, in the illustrated embodiment, is executable to manage operation of client computer system 130. Accordingly, operating system 310 may handle scheduling processes for execution on system 130 as well as allocation of computer resources—e.g., memory allocation, I/O device usage, etc. In various embodiments, operating system 310 also handles the routing of network traffic between applications and a network interface card (NIC) of system 130. In the illustrated embodiment, operating system 310 determines how to route traffic to and from applications based on communication port information 312, which, in some embodiments may map port numbers to process identifiers (PIDs) of applications. That is, when an application intends to communicate traffic, the application may initially make an application programming interface (API) call to operating system 310 in order to open a network port for communicating the traffic. In response, operating system 310 may store an association of the opened port number and the PID of the requesting application in communication port information 312. If traffic addressed to the open port is later received, operating system 310 may identify the corresponding application based on stored association and invoke an interrupt handler of the application in order to notify the application of the received network traffic.

Device identifier 320 is information that is usable to uniquely identify client computer system 130 for authenticating system 130. In some embodiments, identifier 320 is a secret value that is stored in system 130 during provisioning of system 130. In some embodiments, identifier 320 is information specific to the hardware included in system 130. For example, in one embodiment, identifier 320 corresponds to a disk volume identification of the computer system, which may be a volume serial number stored in partition boot sector of a formatted storage drive in client computer system 130. In some embodiments, identifier 320 is a media access control (MAC) address of a NIC included in system 130. In some embodiments, identifier 320 includes registry information maintained by operating system 310.

As noted above, in some embodiments, browser program 132 may not support plug-ins, such as plug-ins 332 shown in FIG. 3, and thus may not be able to use a plug-in 332 to access device identifier 320 in order to authenticate with server computer system 110. Still further, device identifier 320 may be stored at a location that is inaccessible to script 134 (e.g., due to sandboxing by browser program 132). As a result, local host program 136 may be installed on client computer system 130 in order to enable browser program 132 to obtain access to device identifier 320.

In various embodiments, local host program 136 may begin monitoring for traffic from browser program 132 by requesting that operating system 310 open a port for local host program 136 as discussed above. After browser program 132 downloads and begins executing script 134, script 134 may redirect browser program 132 to establish a connection with local host program 136 over the open port. In some embodiments, local host program 136 then communicates device identifier 320 over the established connection to browser program 132, which, in turn, communicates the device identifier 320 in the authentication information provided to server computer system 110. In some embodiments, local host program 136 is executable to access device identifier 320, but provide no further information than identifier 320. For example, in some embodiments, program 136 may be hardcoded to access a predetermined location at which device identifier 320 is stored, but no other location. Accordingly, if browser program 132 were to access for data other than identifier, local host program 136 would be unable to provide that data.

As noted above, the connection between programs 132 and 136 may be a secure connection, which may be established in accordance with SSL or TLS protocols. As part of this establishment, programs 132 and 136 may perform a handshake that includes the exchange and validation of public-key infrastructure (PKI) certificates 334 and 344, which may be X.509 certificates. In various embodiments, these certificates include the public keys held by programs 132 and 136 and used for encrypting traffic between programs 132 and 136. In some embodiments, certificates 334 and 344 are installed in system 130 when system 130 is provisioned (e.g., by an administrator) for accessing private network 100. In the event that one or both certificates are invalid or not present, programs 132 and 136 may be unable to establish a connection, and thus, browser program 132 may be unable to obtain device identifier 320 for communication to server computer system 110. As such, browser program 132 may communicate, to system 110, a connection state value indicating that it failed to establish a connection with program 136 in lieu of sending a device identifier 320. System 110, in turn, may decline client computer system 130's request to access private network 100.

As noted above, in some embodiments, server computer system 110 may merely rely on the success or failure of establishing the connection between programs 132 and 136 in order to authenticate system 130 (as opposed to relying on device identifier 320, which may not be present in some embodiments). Thus, a successful authentication to network 100 may include programs 132 and 136 successfully verifying certificates 334 and 344 and browser program 132 providing a connection state value indicating that the connection was successfully established.

Figure 4:
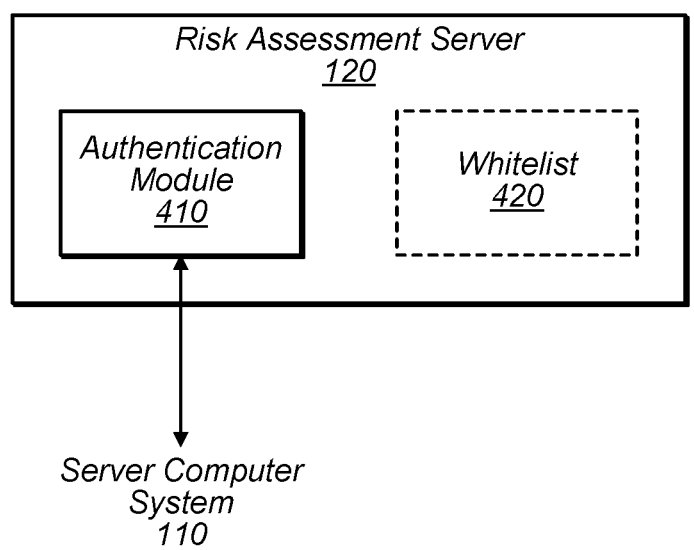
FIG. 4 is a block diagram illustrating an embodiment of a risk assessment server included in the authentication system.

Turning now to FIG. 4, a block diagram of risk assessment server 120 is depicted. As noted above, in some embodiments, risk assessment server 120 is configured to assist server computer system 110 in authenticating client computer system 130, by verifying authentication information received by system 110. In the illustrated embodiment, risk assessment server 120 includes an authentication module 410, and in some embodiments, may also include a whitelist 420.

Risk assessment module 410, in one embodiment, is executable to process requests to verify authentication information. When module 410 receives a request, module 410 may retrieve previously stored authentication information associated with authorized devices and/or users, and compare this information with the authentication information specified in the request. Module 410 may then indicate the result of the comparison in a response to the request. In some embodiments, authentication information for authorized devices and/or users is stored at server 120 in whitelist 420. In other embodiments, whitelist 420 may be located elsewhere—e.g., in a network attached storage accessible to server 120. In some embodiments, module 410 may implement a secure SSL/TLS connection for processing requests from server computer system 110.

Figure 5:
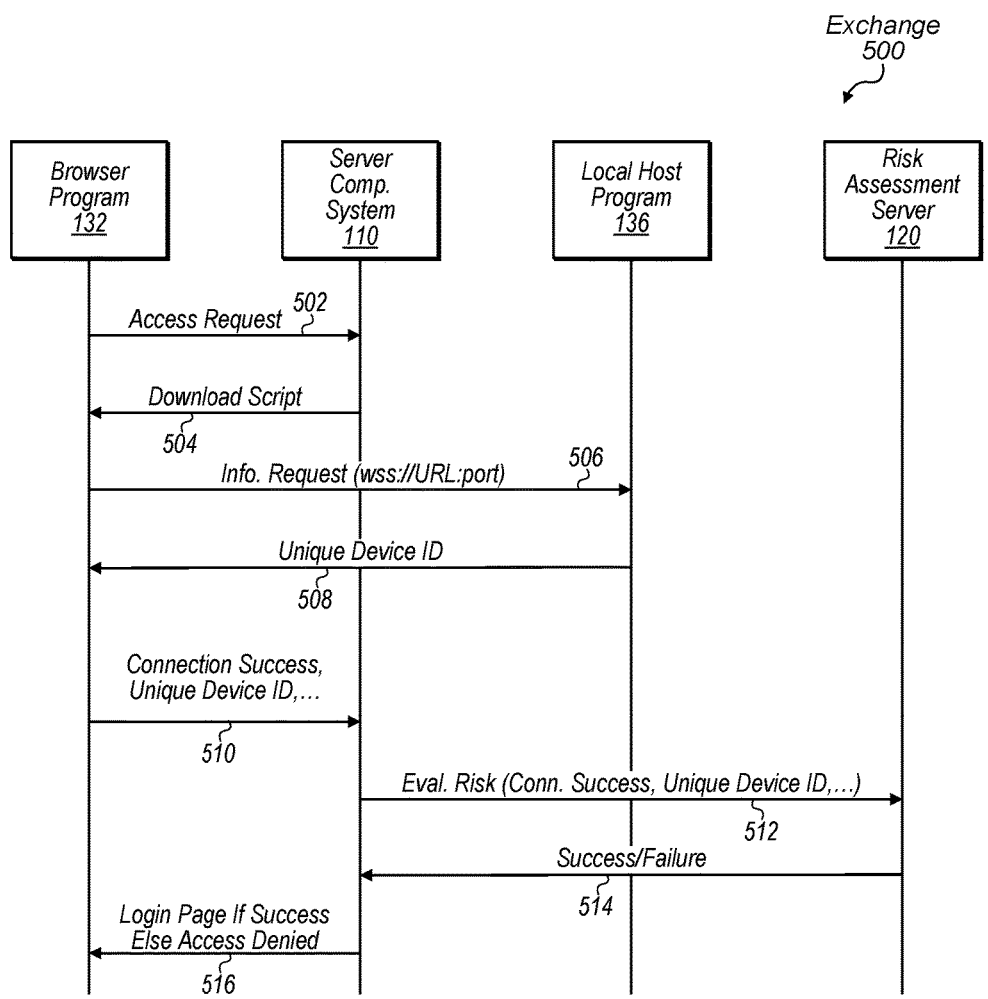
FIG. 5 is a communication diagram illustrating an embodiment of an exchange between components of the authentication system.

Turning now to FIG. 5, a communication diagram of an authentication exchange 500 for client computer system 130 is depicted. In the illustrated embodiment, exchange 500 begins, at 502, with browser program 132 sending an access request for private network 100 to server computer system 110. At 504, browser program 132 downloads script 134 to collect authentication information and, in response to executing of the script, issues a request for information at 506 to local host program 136. In the illustrated embodiment, the request is issued to a WebSocket URL at a port (e.g., port 80) opened by program 136; in other embodiments, the request may be issued to a different URL or port. If a connection can be established with local host program 136, browser program may receive a unique device identifier 320 at 508 and submit, to system 110, authentication information that includes the identifier and an indication the connection was successfully established. At 512, server computer system 110 submits a risk-evaluation request that includes the received authentication information to risk assessment server 120. At 514, risk assessment server 120 responds indicating whether it was able to successfully evaluate the authentication information (i.e., whether the received information belongs to an authorized entity). Based on this response, at 516, server computer system 110 either presents a login page (e.g., to collect additional information for the user) or denies the access request. In other embodiments, system 110 may perform a different process than presenting a login page such as merely granting the request, adding client computer system 130 to a cache of authorized devices, etc.

Figure 6:
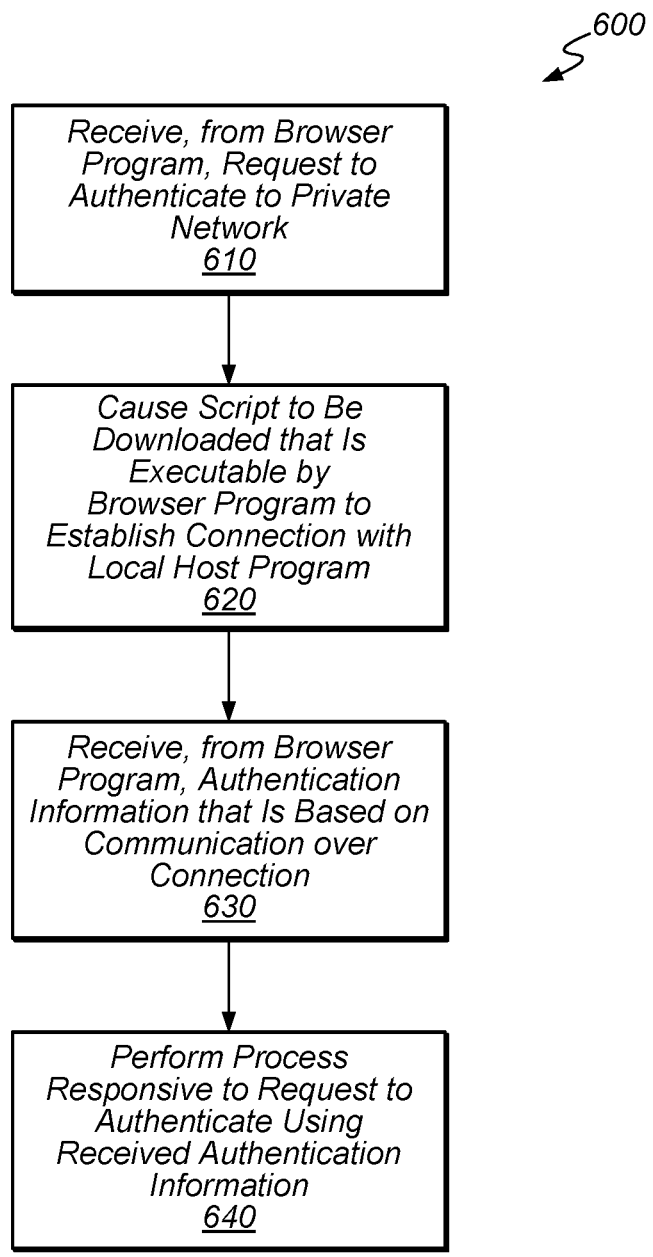
FIG. 6 is a flow diagram illustrating an embodiment of a method performed by the server computer system.

Turning now to FIG. 6, a flow diagram of a method 600 is depicted. Method 600 is one embodiment of a method performed by a server computer system such as system 110. In various embodiments, performance of method 600 (or any of methods 700, 800, or 900) may allow an external device to authenticate without using a web browser plug-in.

In step 610, a server computer system receives, from a browser program executing on a client computer system (e.g., browser program 132 on system 130), a request to authenticate to a private network (e.g., network 100).

In step 620, the server computer system causes a script (e.g., script 134) to be downloaded to the client computer system. In various embodiments, the script is executable by the browser program to establish a connection with a local host program (e.g., local host program 136) executing on the client computer system. In some embodiments, step 620 causes the client computer system to be authenticated to the private network without using a plug-in of the browser program. In some embodiments, the connection is a transport layer security (TLS) connection.

In step 630, the server computer system receives, from the browser program, authentication information that is based on communication between the browser program and the local host program over the connection. In various embodiments, the authentication information includes a connection state value that indicates whether the browser program successfully authenticated to the local host program. In some embodiments, the authentication information includes an identifier (e.g., identifier 320) that identifies the client computer system within the private network, and the identifier is stored on the client computer system in a location that is accessible by the local host program but not the script.

In step 640, a process is performed responsive to the request to authenticate the client computer system to the private network using the received authentication information. In some embodiments, the process to authenticate the client computer system includes storing an indication (e.g., in cache 230) that the identifier of the client computer system is associated with a previously authorized device. In some embodiments, the process to authenticate the client computer system includes sending at least a portion of the authentication information to a risk assessment server (e.g., risk assessment server 120) that is configured to determine whether to authenticate the client computer system to the private network. In some embodiments, step 640 includes providing a login page to the private network to the client computer system in response to the risk assessment server indicating that the request was successful.

Turning now to FIG. 7, a flow diagram of a method 700 is depicted. Method 700 is one embodiment of a method performed by a client computer system such as system 130 executing a server application. Method 700 begins in step 710, where a communication port is opened on the computer system. In various embodiments, the port is opened by a local host program executing on the computer system. In step 720, the communication port is monitored. In step 730, a communication request is received via the communication port from a browser program executing on the computer system. In step 740, an authentication protocol is performed with the browser program via the communication port. In some embodiments, step 740 includes validating a certificate (e.g., certificate 344) of the browser program and indicating in authentication information that the authentication protocol was successful. In step 750, authentication information that is based on the authentication protocol is sent to the browser program, where the authentication information is usable by the browser program to request that the computer system be authenticated as a client to a private network. In some embodiments, the authentication information includes an identifier that uniquely identifies the computer system to an entity associated with the private network, and the identifier is stored on the computer system such that it is accessible by the server application but not the browser program. In some embodiments, the identifier corresponds to a disk volume identification of the computer system.

Turning now to FIG. 8, a flow diagram of a method 800 is depicted. Method 800 is one embodiment of a method performed by a risk assessment server such as server 120. Method 800 begins in step 810, where a risk assessment server receives, from a web server (e.g., server computer system 110), a request to authenticate a client computer system to a private network. In various embodiments, the request includes authentication information received by the web server from a browser program executing on the client computer system. In such an embodiment, the authentication information is based on communication between the browser program and a local host program executing on the client computer system. In some embodiments, the client computer system is authenticated to the private network without using a plug-in of the browser program. In some embodiments, the authentication information includes a connection state value indicating whether the browser program and the local host program successfully authenticated to one another. In some embodiments, the authentication information further includes an identifier that uniquely identifies the client computer system within the private network. In step 820, the risk assessment server sends, to the web server, a response to the request.

Figure 9:
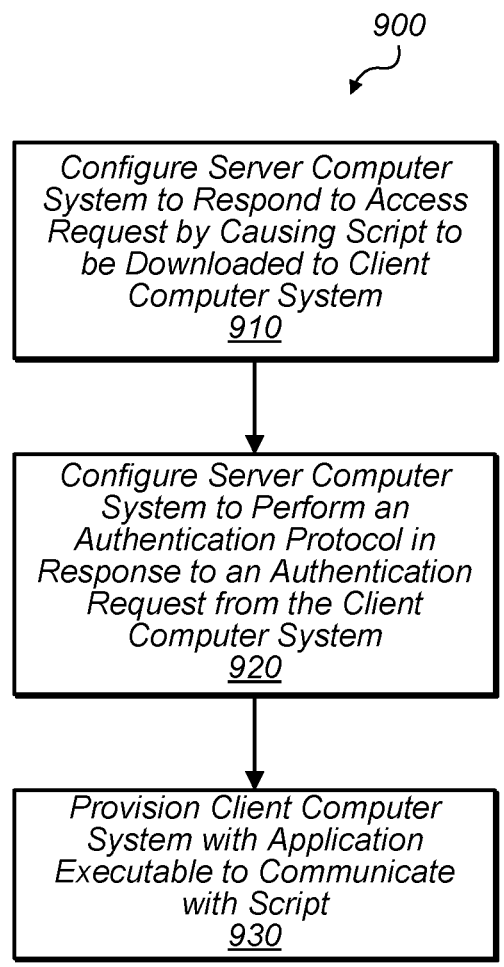
FIG. 9 is a flow diagram illustrating an embodiment of a method for provisioning the authentication system.

Turning now to FIG. 9, a flow diagram of a method 900 for provisioning an authentication system is depicted. In some embodiments, method 900 may be performed by one or more installation programs executed at a server computer system and/or client computer system such as systems 110 and 130 discussed above. In some embodiments, method 900 may be initiated by an administrator of private network 100 and/or client computer system 130. In some embodiments, steps 910-930 may be performed in a different order than shown and/or concurrently.

In step 910, a server computer system is configured to respond to an access request by causing a script (e.g., script 134) to be downloaded to a client computer system. In some embodiments, step 910 may include an installer program on the server computer system storing the script on the server computer system and including program instructions for a web server (e.g., web interface module 210) to serve the script to a client. In some embodiments, these instructions may be included in a web page that is presented when a client device logs into the server computer system.

In step 920, the server computer system is also configured to perform an authentication protocol in response to an authentication request from the client computer system. (In some embodiments, the authentication request and access request may be the same request.) In some embodiments, step 920 may include installing instructions (e.g., risk assessment module 220) that are executable by the server computer system to communicate with a risk assessment server (such as server 120). In another embodiment, step 920 may include installing instructions executable to perform the authentication locally at the server computer system.

In step 930, the client computer system is provisioned with an application (e.g., local host program) executable to communicate with the script. In some embodiments, step 930 includes pushing an installer application to the client computer system, the installer application being executable to cause the application to be installed and begin execution. In some embodiments, the installer application may also facilitate opening a port for the application to begin monitoring for communication from the script. In other embodiments, the installer program performing the provisioning of client computer system may be stored on a computer readable medium that is presented to the client computer system by an administrator.

Exemplary Computer System

Figure 10:
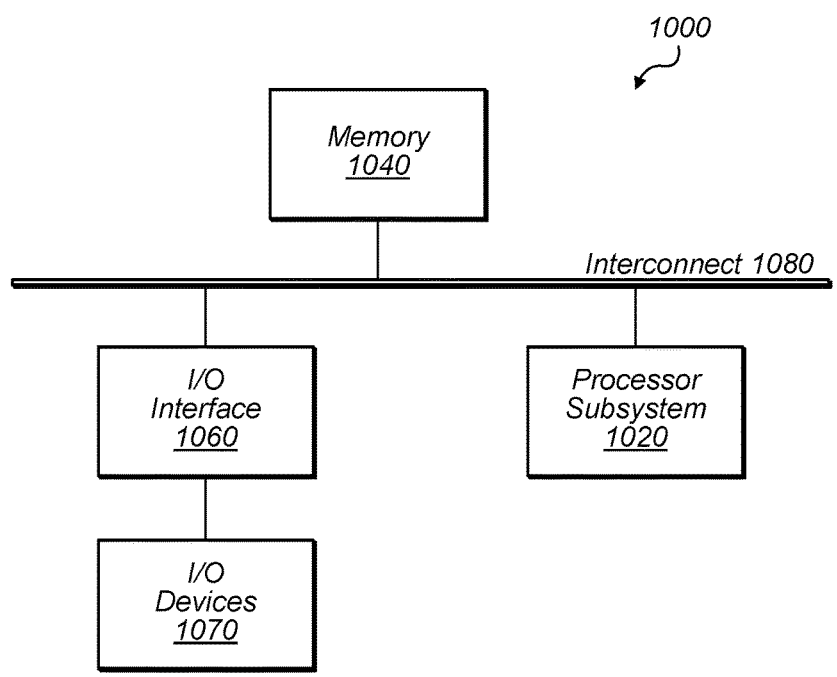
FIG. 10 is a block diagram illustrating an exemplary computer system that may be used to implement one or more of the components in the authentication system.

Turning now to FIG. 10, a block diagram of an exemplary computer system 1000, which may implement one or more computer systems 110-130, is depicted. Computer system 1000 includes a processor subsystem 1020 that is coupled to a system memory 1040 and I/O interfaces(s) 1060 via an interconnect 1080 (e.g., a system bus). I/O interface(s) 1060 is coupled to one or more I/O devices 1070. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1020 may include one or more processors or processing units. In various embodiments of computer system 1000, multiple instances of processor subsystem 1020 may be coupled to interconnect 1080. In various embodiments, processor subsystem 1020 (or each processor unit within 1020) may contain a cache or other form of on-board memory.

System memory 1040 is usable store program instructions executable by processor subsystem 1020 to cause system 1000 perform various operations described herein. System memory 1040 may be implemented using different physical, non-transitory memory media, such as hard disk storage, floppy disk storage, removable disk storage, flash memory, random access memory (RAM-SRAM, EDO RAM, SDRAM, SDRAM, RAMBUS RAM, etc.), read only memory (PROM, EEPROM, etc.), and so on. Memory in computer system 1000 is not limited to primary storage such as memory 1040. Rather, computer system 1000 may also include other forms of storage such as cache memory in processor subsystem 1020 and secondary storage on I/O Devices 1070 (e.g., a hard drive, storage array, etc.). In some embodiments, these other forms of storage may also store program instructions executable by processor subsystem 1020. In some embodiments, memory 1040 may include browser program 132, script 134, and/or local host program 136.

I/O interfaces 1060 may be any of various types of interfaces configured to couple to and communicate with other devices, according to various embodiments. In one embodiment, I/O interface 1060 is a bridge chip (e.g., Southbridge) from a front-side to one or more back-side buses. I/O interfaces 1060 may be coupled to one or more I/O devices 1070 via one or more corresponding buses or other interfaces. Examples of I/O devices 1070 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1070 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. One or more non-transitory computer-readable storage media having stored thereon program instructions that are computer-executable to perform operations comprising:
   receiving, at a server computer system from a browser program executing on a client computer system, a request to authenticate to a private network;
   causing, by the server computer system, a script to be downloaded to the client computer system, wherein the script is executable by the browser program to establish a connection with a local host program executing on the client computer system;
   receiving, at the server computer system from the browser program, authentication information that is based on communication between the browser program and the local host program over the connection, wherein the authentication information includes an identifier that identifies the client computer system within the private network, wherein the identifier is stored on the client computer system in a location that is accessible by the local host program but not the script; and
   performing a process responsive to the request to authenticate the client computer system to the private network using the received authentication information.

2. The computer-readable storage media of claim 1, wherein the program instructions are computer-executable to cause the client computer system to be authenticated to the private network without using a plug-in of the browser program, and wherein the connection is a transport layer security (TLS) connection.

3. The computer-readable storage media of claim 1, wherein the authentication information includes a connection state value that indicates whether the browser program successfully authenticated to the local host program.

4. The computer-readable storage media of claim 1, wherein the process to authenticate the client computer system includes storing an indication that the identifier of the client computer system is associated with a previously authorized device.

5. The computer-readable storage media of claim 1, wherein the process to authenticate the client computer system includes sending at least a portion of the authentication information to a risk assessment server that is configured to determine whether to authenticate the client computer system to the private network.

6. The computer-readable storage media of claim 5, wherein the operations further comprise providing a login page to the private network to the client computer system in response to the risk assessment server indicating that the request was successful.

7. The computer-readable storage media of claim 1, further comprising program instructions executable by the client computer system to implement the local host program, wherein the local host program is operable to implement an HTTPS server.

8. A method, comprising:
   receiving, at a server computer system from a browser program executing on a client computer system, a request to authenticate to a private network;
   causing installation of a local host program on the client computer system, wherein the local host program is executable to open a port that is accessible by the browser program to establish a connection with the local host program;
   causing, by the server computer system, the browser program to establish the connection with the local host program executing on the client computer system;
   receiving, at the server computer system from the browser program, authentication information that is based on communication between the browser program and the local host program over the connection; and
   performing a process to authenticate the client computer system to the private network using the received authentication information.

9. The method of claim 8, wherein the authentication information includes a device identifier that identifies the client computer system to an entity associated with the private network, wherein the device identifier is accessible by the local host program but not the browser program.

10. The method of claim 9, wherein the authentication information further includes a connection state value indicating that the browser program successfully authenticated to the local host program.

11. The method of claim 10, wherein the process to authenticate the client computer system to the private network includes sending a request from the server computer system to a risk assessment server, wherein the sent request includes the device identifier and the connection state value, and wherein the risk assessment server is configured to return an authentication result responsive to the sent request.

12. The method of claim 8, wherein the connection is a transport layer security (TLS) connection and the authentication information includes a connection state value indicating that the browser program successfully authenticated to the local host program.

13. The method of claim 8, wherein the causing includes causing a script to be downloaded to the client computer system, wherein the script is executable by the browser program to establish the connection with the local host program, and wherein the request to authenticate to the private network is handled without using a plug-in of the browser program.

14. A method, comprising:
   receiving, at a risk assessment server from a web server, a request to authenticate a client computer system to a private network, wherein the request includes authentication information received by the web server from a browser program executing on the client computer system, wherein the authentication information is based on communication between the browser program and a local host program executing on the client computer system, wherein the authentication information includes a connection state value indicating whether the browser program and the local host program successfully authenticated to one another, and wherein the authentication information further includes an identifier that uniquely identifies the client computer system within the private network; and sending, by the risk assessment server to the web server, a response to the request; and wherein the client computer system is authenticated to the private network without using a plug-in of the browser program.

* * * * *